(12) United States Patent
Azad et al.

(10) Patent No.: US 12,483,565 B2
(45) Date of Patent: Nov. 25, 2025

(54) URL RISK ANALYSIS USING HEURISTICS AND SCANNING

(71) Applicant: Zscaler, Inc., San Jose, CA (US)

(72) Inventors: Rubin Azad, Milpitas, CA (US);
Deepen Desai, San Ramon, CA (US);
Narinder Paul, Sunnyvale, CA (US)

(73) Assignee: Zscaler, Inc., San Jose, CA (US)

( * ) Notice: Subject to any disclaimer, the term of this patent is extended or adjusted under 35 U.S.C. 154(b) by 1100 days.

(21) Appl. No.: 17/374,080

(22) Filed: Jul. 13, 2021

(65) Prior Publication Data

US 2021/0344693 A1 Nov. 4, 2021

Related U.S. Application Data

(63) Continuation-in-part of application No. 17/075,991, filed on Oct. 21, 2020, and a continuation-in-part of application No. 16/889,885, filed on Jun. 2, 2020, and a continuation-in-part of application No. 16/776,868, filed on Jan. 30, 2020, now Pat. No. 11,829,467.

(30) Foreign Application Priority Data

Dec. 18, 2019 (IN) .............................. 201911052560
Sep. 3, 2020 (IN) .............................. 202011038100

(51) Int. Cl.
*H04L 9/40* (2022.01)
*G06N 20/00* (2019.01)
(52) U.S. Cl.
CPC ......... *H04L 63/1416* (2013.01); *G06N 20/00* (2019.01); *H04L 63/0236* (2013.01); *H04L 63/1425* (2013.01)

(58) Field of Classification Search
None
See application file for complete search history.

(56) References Cited

U.S. PATENT DOCUMENTS

| | | |
|---|---|---|
| 7,062,680 B2 | 6/2006 | Sirbu |
| 7,181,769 B1 | 2/2007 | Keanini et al. |
| 7,392,543 B2 | 6/2008 | Szor |
| 7,894,350 B2 | 2/2011 | Kailash et al. |
| 7,899,849 B2 | 3/2011 | Chaudry et al. |

(Continued)

OTHER PUBLICATIONS

Garera et al., "A Framework for Detection and Measurement of Phishing Attacks", Nov. 2, 2007, ACM, 8 Pages (Year: 2007).*

(Continued)

*Primary Examiner* — Christopher C Harris
(74) *Attorney, Agent, or Firm* — Baratta Law PLLC; Lawrence A. Baratta, Jr.; Ryan Odessa

(57) ABSTRACT

Systems and methods include, responsive to starting a plurality of listener modules, receiving a Uniform Resource Locator (URL) for a site on the Internet into a database; loading the URL; receiving artifacts based on the loading; using the plurality of listener modules to run rules based on the received artifacts; scoring the URL based on the rules and the received artifacts; and determining whether the URL is one of benign, suspicious, or malicious based on the scoring. The steps can include any of blocking the URL, allowing the URL, further analyzing the URL, adding the URL to a whitelist or blacklist, and providing a notification, based on whether the URL is benign, suspicious, or malicious.

20 Claims, 9 Drawing Sheets

(56) References Cited

U.S. PATENT DOCUMENTS

| | | |
|---|---|---|
| 8,171,554 B2 | 5/2012 | Elovici et al. |
| 8,181,245 B2 | 5/2012 | Tripathi et al. |
| 8,185,510 B2 | 5/2012 | Chaudry et al. |
| 8,347,386 B2 | 1/2013 | Mahaffey et al. |
| 8,365,259 B2 | 1/2013 | Chaudry et al. |
| 8,402,539 B1 | 3/2013 | Chen et al. |
| 8,413,238 B1 | 4/2013 | Sutton |
| 8,413,239 B2 | 4/2013 | Sutton et al. |
| 8,453,234 B2 | 5/2013 | Dawson et al. |
| 8,464,335 B1 | 6/2013 | Sinha et al. |
| 8,478,708 B1 | 7/2013 | Larcom |
| 8,484,726 B1 | 7/2013 | Sutton |
| 8,510,838 B1 | 8/2013 | Sun et al. |
| 8,549,581 B1 | 10/2013 | Kailash et al. |
| 8,607,066 B1 | 12/2013 | Kailash et al. |
| 8,863,288 B1 | 10/2014 | Savage et al. |
| 8,887,249 B1 | 11/2014 | Schekochikhin et al. |
| 9,065,850 B1 | 6/2015 | Sobrier |
| 9,152,789 B2 | 10/2015 | Natarajan et al. |
| 10,142,362 B2 | 11/2018 | Weith et al. |
| 10,419,477 B2 | 9/2019 | Desai et al. |
| 10,498,605 B2 | 12/2019 | Weith et al. |
| 10,778,702 B1 * | 9/2020 | Huang ................ H04L 63/0236 |
| 11,636,198 B1 * | 4/2023 | Kulkarni ............... G06F 21/564 |
| | | 726/22 |
| 11,770,388 B1 * | 9/2023 | Laconic ................. H04L 67/12 |
| | | 726/23 |
| 2005/0188272 A1 | 8/2005 | Bodorin et al. |
| 2006/0075500 A1 | 4/2006 | Bertman et al. |
| 2007/0233477 A1 | 10/2007 | Halowani |
| 2007/0266421 A1 | 11/2007 | Vaidya et al. |
| 2008/0098478 A1 | 4/2008 | Vaidya et al. |
| 2010/0031353 A1 | 2/2010 | Thomas et al. |
| 2010/0095277 A1 | 4/2010 | Cheng et al. |
| 2010/0115621 A1 | 5/2010 | Staniford et al. |
| 2012/0079596 A1 | 3/2012 | Thomas et al. |
| 2012/0304244 A1 | 11/2012 | Xie et al. |
| 2013/0091571 A1 | 4/2013 | Lu et al. |
| 2013/0239214 A1 | 9/2013 | Klein et al. |
| 2013/0291087 A1 | 10/2013 | Kailash et al. |
| 2013/0305357 A1 | 11/2013 | Ayyagari et al. |
| 2013/0333032 A1 | 12/2013 | Delatorre et al. |
| 2013/0347094 A1 | 12/2013 | Bettini et al. |
| 2014/0090059 A1 | 3/2014 | Wang et al. |
| 2014/0195476 A1 * | 7/2014 | Sxhmidt ............ G06Q 30/0633 |
| | | 707/609 |
| 2015/0007312 A1 * | 1/2015 | Pidathala ............ H04L 63/1433 |
| | | 726/22 |
| 2015/0096022 A1 | 4/2015 | Vincent et al. |
| 2016/0344770 A1 | 11/2016 | Verma et al. |
| 2016/0366100 A1 * | 12/2016 | Liu ....................... G06F 21/552 |
| 2017/0063886 A1 | 3/2017 | Muddu et al. |
| 2018/0150758 A1 | 5/2018 | Niininen et al. |
| 2018/0293381 A1 | 10/2018 | Tseng et al. |
| 2019/0281073 A1 | 9/2019 | Weith et al. |
| 2019/0319972 A1 | 10/2019 | Desai |
| 2020/0036751 A1 * | 1/2020 | Kohavi ............... H04L 63/1416 |

OTHER PUBLICATIONS

Elovici et al., "Applying Machine Learning Techniques for Detection of Malicious Code in Network Traffic," KI 2007, LNAI 4667, pp. 44-50.

Overton, Anti-Malware Tools: Intrusion Detection Systems, IBM, Apr. 30, 2005-May 3, 2005, pp. 1-22.

Van Randwyk et al., "Farm: An Automated Malware Analysis Environment", Security Technology, 2008, ICCST 2008, 42nd Annual IEEE International Carnahan Conference on IEEE, 2008, pp. 1-5.

Xie et al., "iPanda: A Comprehensive Malware Analysis Tool", Information Networking (ICOIN), 2013 International Conference on IEEE, 2013, pp. 1-6.

Jordaney et al., "Transcend: Detecting Concept Drift in Malware Classification Models," 26th {USENIX} Security Symposium ({USENIX} Security 17), 2017, pp. 1-20.

Kantchelian et al., "Evasion and Hardening of Tree Ensemble Classifiers," International Conference on Machine Learning, 2016, pp. 1-10.

Tolomei et al., "Interpretable Predictions of Tree-based Ensembles via Actionable Feature Tweaking," Proceedings of the 23rd ACM SIGKDD International Conference on Knowledge Discovery and Data Mining, ACM, 2017, pp. 1-10.

* cited by examiner

URL RISK ANALYSIS USING HEURISTICS AND SCANNING

CROSS-REFERENCE TO RELATED APPLICATIONS

The present disclosure is a continuation-in-part of the following patent applications, each of which is incorporated by reference in its entirety:

U.S. patent application Ser. No. 16/776,868, filed Jan. 30, 2020, and entitled "Dynamic rules engine in a cloud-based sandbox," which claims priority to Indian Patent Application No. 201911052560, filed Dec. 18, 2019;

U.S. patent application Ser. No. 16/889,885, filed Jun. 2, 2020, and entitled "Phishing detection of uncategorized URLs using heuristics and scanning"; and U.S. patent application Ser. No. 17/075,991, filed Oct. 21, 2020, and entitled "Utilizing Machine Learning for dynamic content classification of URL content," which claims priority to Indian Patent Application No. 202011038100, filed Sep. 3, 2020.

FIELD OF THE DISCLOSURE

The present disclosure relates generally to networking and computing. More particularly, the present disclosure relates to systems and methods for Uniform Resource Locator (URL) risk analysis using heuristics and scanning.

BACKGROUND OF THE DISCLOSURE

A URL ("web address") is a reference to a web resource on a network and a mechanism to retrieve the web resource. These are well-known in the art, e.g., www.example.com. With the expansion of Top-Level Domains (TLDs), there are new URLs constantly emerging, leading to risk. Malware, short for malicious software, is software used to disrupt computer operation, gather sensitive information, and/or gain access to private computer systems. It can appear in the form of code, scripts, active content, and other software. 'Malware' is a general term used to refer to a variety of forms of hostile or intrusive software. Malware includes, for example, computer viruses, ransomware, worms, Trojan horses, rootkits, key loggers, dialers, spyware, adware, malicious Browser Helper Objects (BHOs), rogue security software, and other malicious programs; the majority of active malware threats are usually worms or Trojans rather than viruses. New, unknown URLs can pose a risk for malware distribution.

Also, phishing is the fraudulent process of attempting to acquire sensitive information, such as usernames, passwords, payment detail, personal identification information, etc., by masquerading as a trustworthy entity. For example, communications purporting to be from popular social web sites, auction sites, online payment processors, banks or other financial institutions, etc. are commonly used to lure unsuspecting users. Phishing often directs users to enter details at a fake website whose look and feel are almost identical to a legitimate one, such website having a URL associated with it. Phishing is an example of social engineering used to fool users and exploit the poor usability of current web security technologies. For example, emails, supposedly from the Internal Revenue Service, have been used to glean sensitive data from U.S. taxpayers. Most methods of phishing use some form of technical deception designed to make a link appear to belong to the spoofed organization. Misspelled URLs or the use of subdomains are common tricks used by phishers. In the following example URL, www.yourbank.example.com/, it appears as though the URL will take you to the example section of the yourbank website; actually this URL points to the "yourbank" (i.e., phishing) section of the example website. That is, phishing focuses on using popular brands to confuse users. Another common trick is to make the displayed text for a link (the text between the <A> tags) suggest a reliable destination, when the link actually goes to a phishers' site.

Unfortunately, phishing is very common and very effective using social engineering. There have been various recent email hacking horror stories in the corporate and political areas. These basically occur where emails, text messages, etc. are sent to unsuspecting users who inadvertently provide their credentials into phishing sites. As such, the malicious actors obtain the credentials and use it for their malicious goals. Organizations and individuals have been held hostage by these malicious actors. As long as users continue to input credentials for accessing resources, malicious actors will seek to exploit this security weakness.

Existing phishing sites that have been detected are categorized in lists of known phishing sites. This can be used to block users, notify users, etc. However, malicious entities are ever evolving, and new phishing sites pop up all the time. In fact, phishing sites generally have a very short lifetime since once caught, they are no longer effective for their malicious goals. Thus, new phishing sites are put up constantly to evade categorization. A new, uncategorized site may be a phishing site or it may be a legitimate site. One policy may include blocking all new, uncategorized sites. However, this leads to poor user experience where new legitimate sites are blocked. Another policy may include scanning and detailed analysis of such new, uncategorized sites. However, this leads to latency which also leads to poor user experience. A further policy may include no phishing protection at all leaving it up to the user to manually identify legitimate or phishing sites. Of course, this approach is ineffective. There is a need to quickly, correctly, and efficiently identify whether a new site is phishing or legitimate.

There is also a need to quickly, correctly, and efficiently identify a risk of a new, unknown URL.

BRIEF SUMMARY OF THE DISCLOSURE

The present disclosure relates to systems and methods for Uniform Resource Locator (URL) risk analysis using heuristics and scanning. A URL risk analyzer is configured to analyze URLs based on artifacts extracted from the URL. Rules get triggered based on artifact or set of artifacts and the aggregate count is scored for the URL. A URL can be classified in one of the three categories such as benign, suspicious or malicious. This can be performed based on Postgres notify and listen. Once a new URL is scanned, actions can be taken such as further analysis, URL categorization, whitelisting/blacklisting, updating YARA rules, and the like.

Systems and methods include, responsive to starting a plurality of listener modules, receiving a Uniform Resource Locator (URL) for a site on the Internet into a database; loading the URL; receiving artifacts based on the loading; using the plurality of listener modules to run rules based on the received artifacts; scoring the URL based on the rules and the received artifacts; and determining whether the URL is one of benign, suspicious, or malicious based on the scoring. The steps can include any of blocking the URL, allowing the URL, further analyzing the URL, adding the URL to a whitelist or blacklist, and providing a notification, based on whether the URL is benign, suspicious, or malicious.

Also, the present disclosure relates to systems and methods of phishing detection of uncategorized Uniform Resource Locators (URLs) using heuristics and scanning. The phishing detection can detect if a URL is a likely phishing site or legitimate. An input to the phishing detection includes a URL, such as a new, uncategorized URL. The phishing detection scans the URL itself to determine whether it is phishing. The scan includes use of a Machine Learning (ML) model trained to detect suspicious URLs. For example, the phishing detection can use Term Frequency—Inverse Document Frequency (TDIDF) to generate features of a URL, and a Logical Regression model to train the model and predict using the trained model with the features generated by TDIDF. After a URL is flagged as suspicious, the phishing detection loads the URL, such as in isolation, and looks to identify a brand associated with the URL. Specifically, the present disclosure relates to detecting phishing URLs that attempt to impersonate legitimate brands. The load can be used to determine whether the suspect URL is phishing or legitimate based on analysis of code, metadata, etc. With the scan and load, the phishing detection can quickly, correctly, and efficiently categorize a suspect URL. Once categorized, the phishing detection can cause the URL to be allowed or blocked.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Uniform Resource Locator (URL) risk analysis using heuristics and scanning. A URL risk analyzer is configured to analyze URLs based on artifacts extracted from the URL. Rules get triggered based on artifact or set of artifacts and the aggregate count is scored for the URL. A URL can be classified in one of the three categories such as benign, suspicious or malicious. This can be performed based on Postgres notify and listen. Once a new URL is scanned, actions can be taken such as further analysis, URL categorization, whitelisting/blacklisting, updating YARA rules, and the like.

Again, the present disclosure relates to systems and methods of phishing detection of uncategorized Uniform Resource Locators (URLs) using heuristics and scanning. The phishing detection can detect if a URL is a likely phishing site or legitimate. An input to the phishing detection includes a URL, such as a new, uncategorized URL. The phishing detection scans the URL itself to determine whether it is phishing. The scan includes use of a Machine Learning (ML) model trained to detect suspicious URLs. For example, the phishing detection can use Term Frequency—Inverse Document Frequency (TDIDF) to generate features of a URL, and a Logical Regression model to train the model and predict using the trained model with the features generated by TDIDF. After a URL is flagged as suspicious, the phishing detection loads the URL, such as in isolation, and looks to identify a brand associated with the URL. Specifically, the present disclosure relates to detecting phishing URLs that attempt to impersonate legitimate brands. The load can be used to determine whether the suspect URL is phishing or legitimate based on analysis of code, metadata, etc. With the scan and load, the phishing detection can quickly, correctly, and efficiently categorize a suspect URL. Once categorized, the phishing detection can cause the URL to be allowed or blocked.

URL Risk Detection System

Figure 1:
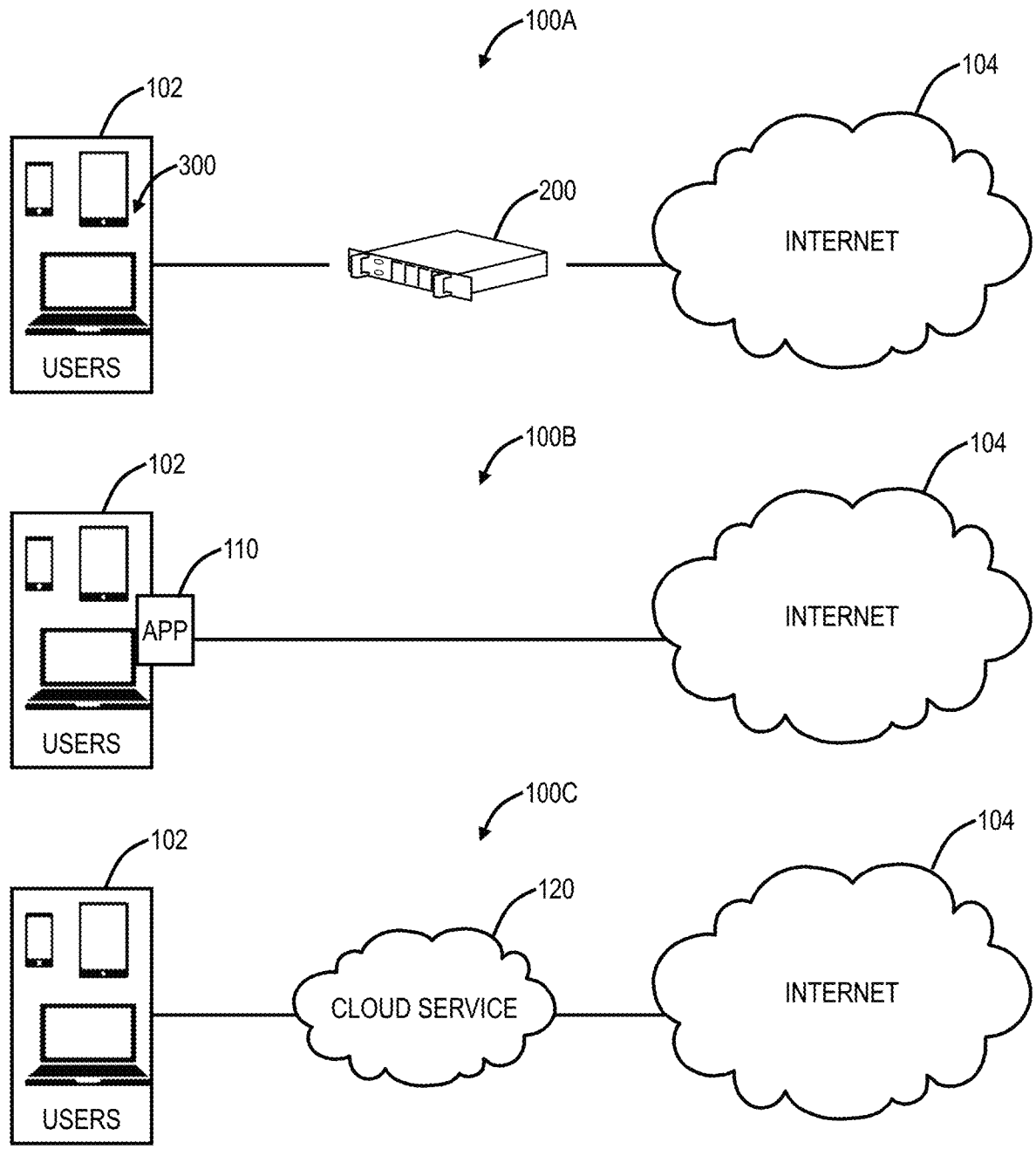
FIG. 1 is a network diagram of three example network configurations of URL risk detection between a user (each having a user device such as illustrated in FIG. 3) and the Internet (e.g., a server such as illustrated in FIG. 2).
Figure 2:
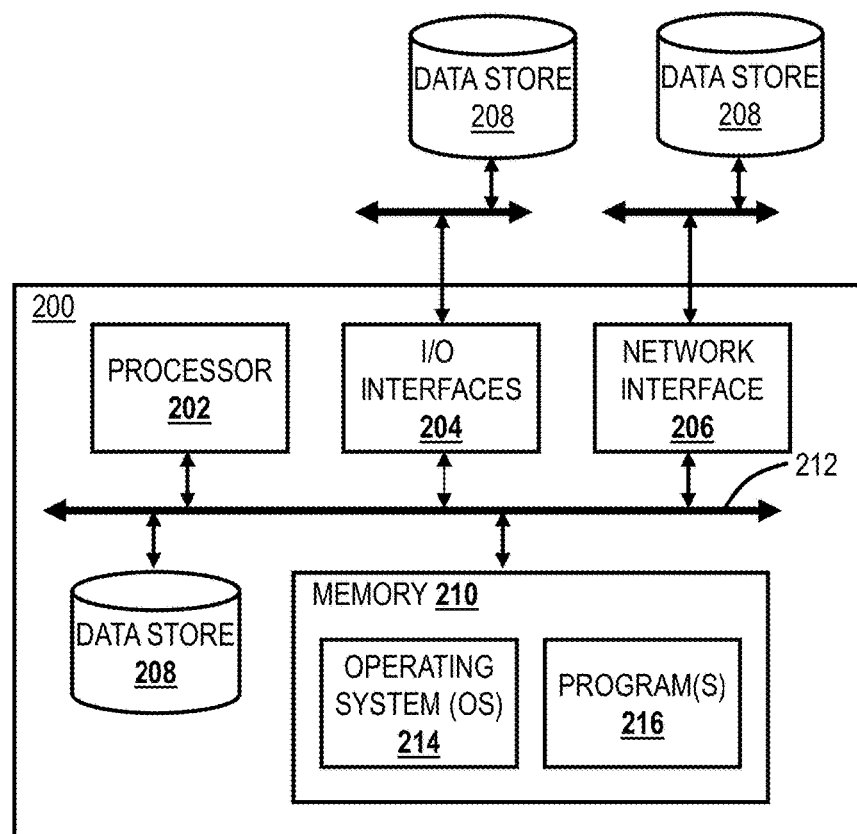
FIG. 2 is a block diagram of a server, which may be used in as a destination on the Internet, for a network configuration of phishing detection, etc.
Figure 3:
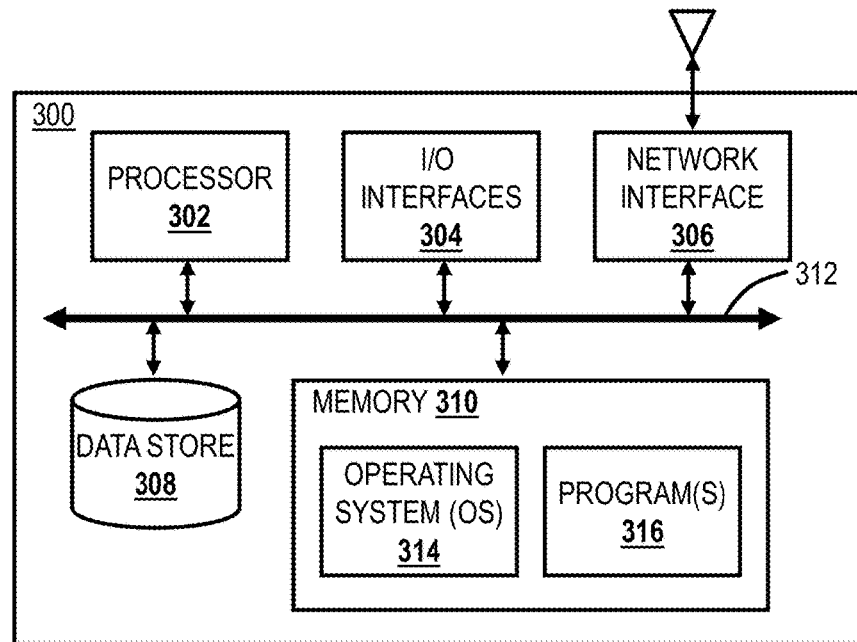
FIG. 3 is a block diagram of a user device that is configured to request URLs.

FIG. 1 is a network diagram of three example network configurations 100A, 100B, 100C of URL risk and phishing detection between a user 102 (each having a user device 300 such as illustrated in FIG. 3) and the Internet 104 (e.g., a server 200 such as illustrated in FIG. 2). The objective of URL risk and phishing detection is to identify a URL requested by the user 102 as benign, suspicious, malicious, or phishing, and to block and/or flag suspicious, malicious, or phishing URLs and allow legitimate, benign URLs. For example, the suspicious, malicious, or phishing URLs can be physically blocked so that the user 102 is unable to access these sites. Alternatively, the suspicious, malicious, or phishing URLs can be flagged to the user, e.g., "this site is a potential suspicious, malicious, or phishing site," allowing the user to proceed with caution. In a further embodiment, the suspicious, malicious, or phishing URLs can be loaded in isolation. Those skilled in the art will recognize the example network configurations 100A, 100B, 100C are described herein for illustration purposes and the URL risk and phishing detection contemplates use in other approaches.

The network configuration 100A includes a server 200 located between the user 102 and the Internet 104. For example, the server 200 can be a proxy, a gateway, a Secure Web Gateway (SWG), Secure Internet and Web Gateway, etc. The server 200 is illustrated located inline with the user 102 and configured to monitor URL requests for phishing detection and remediation. In other embodiments, the server 200 does not have to be inline. For example, the server 200 can monitor the URL requests and provide feedback to the user 102 or specific actions to the user device 300. The server 200 can be on a local network associated with the user 102 as well as external, such as on the Internet 104. The network configuration 100B includes an application 110 that is executed on the user device 300. The application 110 can perform the same functionality as the server 200, as well as coordinated functionality with the server 200. Finally, the network configuration 100C includes a cloud service 120 configured to monitor the user 102 and perform the URL risk and phishing detection. Of course, various embodiments are contemplated herein, including combinations of the network configurations 100A, 100B, 100C together.

The overall objective of the URL risk and phishing detection includes identifying whether or not a URL is benign, suspicious, malicious, or phishing and allowing/blocking/alerting based thereon. To that end, the URL risk and phishing detection can include the maintenance of a malicious list that includes all URLs categorized as suspicious, malicious, or phishing. The URL risk and phishing detection can add newly categorized sites to this list as well. For example, the application 110 may be a browser add-in or agent that prohibits access to any sites in the list.

Example Server Architecture

FIG. 2 is a block diagram of a server 200, which may be used in as a destination on the Internet, for the network configuration 100A, etc. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

Example User Device Architecture

FIG. 3 is a block diagram of a user device 300, which may be used by a user 102. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 3 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile-optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another, but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end-user functionality with the user device 300. For example, example programs 316 may include, but not limited to, a web browser, social networking applications, streaming media applications, games, mapping and location applications, electronic mail applications, financial applications, and the like. The application 110 can be one of the example programs.

Phishing Detection

Figure 4:
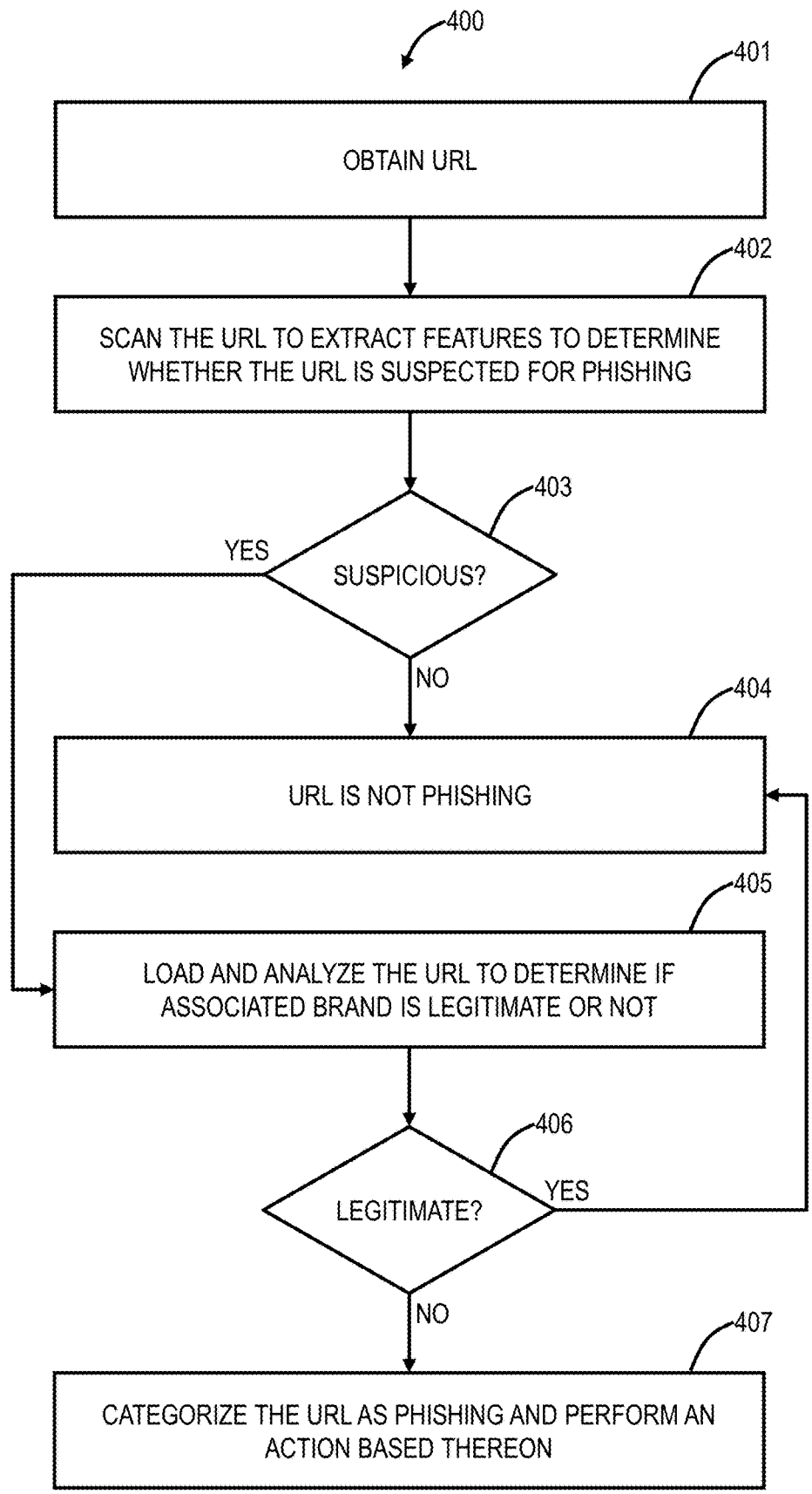
FIG. 4 is a flowchart of a phishing detection process.

FIG. 4 is a flowchart of a phishing detection process 400. The phishing detection process 400 contemplates implementation as a computer-implemented method, as instructions embodied in a non-transitory computer readable medium, and via a processing device such as the server 200. The phishing detection process 400 can be used to categorize a URL as phishing or legitimate. Such categorization can be used to manage a list of phishing sites for use in the network configurations 100A, 100B, 100C as well as other network configurations. The objective of the phishing detection process 400 is to determine whether or not a user 102 can access a URL.

The phishing detection process 400 includes obtaining a URL (step 401). This can be based on monitoring of the user 102. This can also be offline where a list of new URLs are provided to a server 200 or the like for categorization. That is, the phishing detection process 400 contemplates any technique where the URL is provided. In an embodiment, there can be a list of known phishing sites and the obtained URL can be one that is not in the list, i.e., new and uncategorized.

The phishing detection process 400 includes scanning the URL to extract features to determine whether the URL is suspected for phishing (step 402). The phishing detection process 400 utilizes a Machine Learning (ML) model to find suspicious URLs. In an embodiment, TFIDF is used to generate features of a URL. TFIDF is combination of two statistical techniques, TF—Term Frequency and IDF—Inverse Document Frequency.

The features are extracted solely from the URL itself. For example, the features can include keywords in the URL, redirection in the URL, a suspicious Top-Level Domain (TLD), a non-standard port, fake Hypertext Transfer Protocol Secure (HTTPS), a Message Digest 5 (MD5) in the URL, a shortener in the URL, an @ symbol in the URL, an Internet Protocol (IP) address in the URL, too many subdomains in the URL, etc.

The keywords in the URL that have been determined to be suspicious for phishing include:

| | | | |
|---|---|---|---|
| login | transaction | secure | safe |
| log-in | recover | ebayispai | session |
| sign-in | unlock | https | support |
| signin | confirm | auth | suport |
| account | live | authorize | unlock |
| verification | office | myaccount | update |
| verify | service | activation | verify |
| webscr | manage | #apps | verification |
| password | invoice | confirm | everivcation |
| credentuail | secure | drive | verifications |
| support | customer | mails | wallet |
| activity | client | mail | weblogin |
| security | bill | managment | management |
| update | online | password | .wellknown |
| authentication | safe | permission | .well-known |
| authenticate | form | permision | spotify |
| authorize | confirm | recovery | |
| alert | account | recover | |
| purchase | banking | register | |

Redirection in the URL is a technique where the URL redirects to another page when the URL is opened. There are legitimate reasons for redirection such as for URL shortening, to prevent broken links, to allow multiple domain names to refer to a single web site, privacy, etc. Top-level domains (TLDs), such as .com, .org, and .edu, are the most prominent domains on the Internet 104. A suspicious TLD is a TLD far less familiar to everyday internet users, and frequently weaponized for malicious objectives. Suspicious TLDs—domains ending with things like .xyz, .gq, .country, .stream,—are popular with cybercriminals because they are usually cheaper to obtain than more universally recognized TLDs.

Non-standard ports can include various ports that are used by HTTP/HTTP besides ports 80 and 443. Some example non-standard ports can include 9090, 8080, 22, 23, 25, 53, 161, 445, 3389, 5500, 5900 . . . 5999, 9001, etc. Fake HTTPS means the URL displays a secure icon, but it is fake. Phishers utilize fake HTTPS to give a sense of security to unsuspecting users 102. An MD5 includes a hash in the URL. A shortener in the URL can be something like x.xyz, etc. and utilizes redirection.

These are ten examples of features that can be extracted from the obtained URL. The phishing detection process 400 can also use a ML model that is trained and then used to identify suspicious URLs. In an embodiment, a Logistic Regression model is used to train/predict the model using features generated by TFIDF. Of note, the Logistic Regression model was determined to have the best detection efficacy. The ML model is trained utilizing a set of training data where a set of URLs are provided—a first subset including legitimate URLs and a second subset including phishing URLs. The training can be updated over time with a new set of training data as the phishing environment is constantly evolving to evade detection.

Once trained, the ML model can be used in production (i.e., in a working environment) to categorize URLs as suspected of phishing or not (step 403). Specifically, the obtained URL has its features extracted (step 402) and is analyzed with the ML model (step 402). An output of the ML model includes whether the obtained URL is suspicious for phishing or not (step 403). If the URL is not suspicious (step 403), the phishing detection process 400 categorizes the URL as legitimate (not phishing) (step 404). This categorization can be used to allow the user 102 to access the URL, to keep the URL off a list of phishing sites, to keep the URL on a list of legitimate sites, etc.

If the ML categorizes the obtained URL as suspicious (step 403), the phishing detection process 400 includes loading and analyzing the URL to determine if the associated brand is legitimate or not (step 405). Again, the phishing detection process 400 is for detecting phishing sites that masquerade as legitimate brands, e.g., bancofamerica.com instead of bankofamerica.com. After the URL is classified as suspicious by the ML model (step 403), the phishing detection process 400 next determines whether it is legitimate or not for the brand. That is, this could be a legitimate site owned by the brand owner, not a phishing site.

The loading and analyzing can inspect the title, copyright, metadata, and page text of the URL for the purposes of determining whether the site is legitimate with respect to the brand or a phishing site using someone else's brand (step 406). Of note, a phishing site typically focuses solely on the visible aspects to the user 102 and does not focus on the code, e.g., the title, copyright, metadata, and page text. Inspection of this data enables a determination of whether the obtained URL is legitimate or not. The page text can be obtained by taking a screenshot of the loaded page and performing Optical Character Recognition (OCR).

Legitimate sites will have the title, copyright, and metadata match the page text that is obtained from the OCR. If the obtained URL is legitimate (step 406), the phishing detection process 400 categorizes the URL as legitimate (not phishing) (step 404). If the obtained URL is phishing (step 406), the phishing detection process 400 categorizes the URL as phishing and includes performing an action based thereon. The actions can include blocking the URL, updating a list of phishing sites, presenting an alert to the user, and the like.

URL Risk

Figure 5:
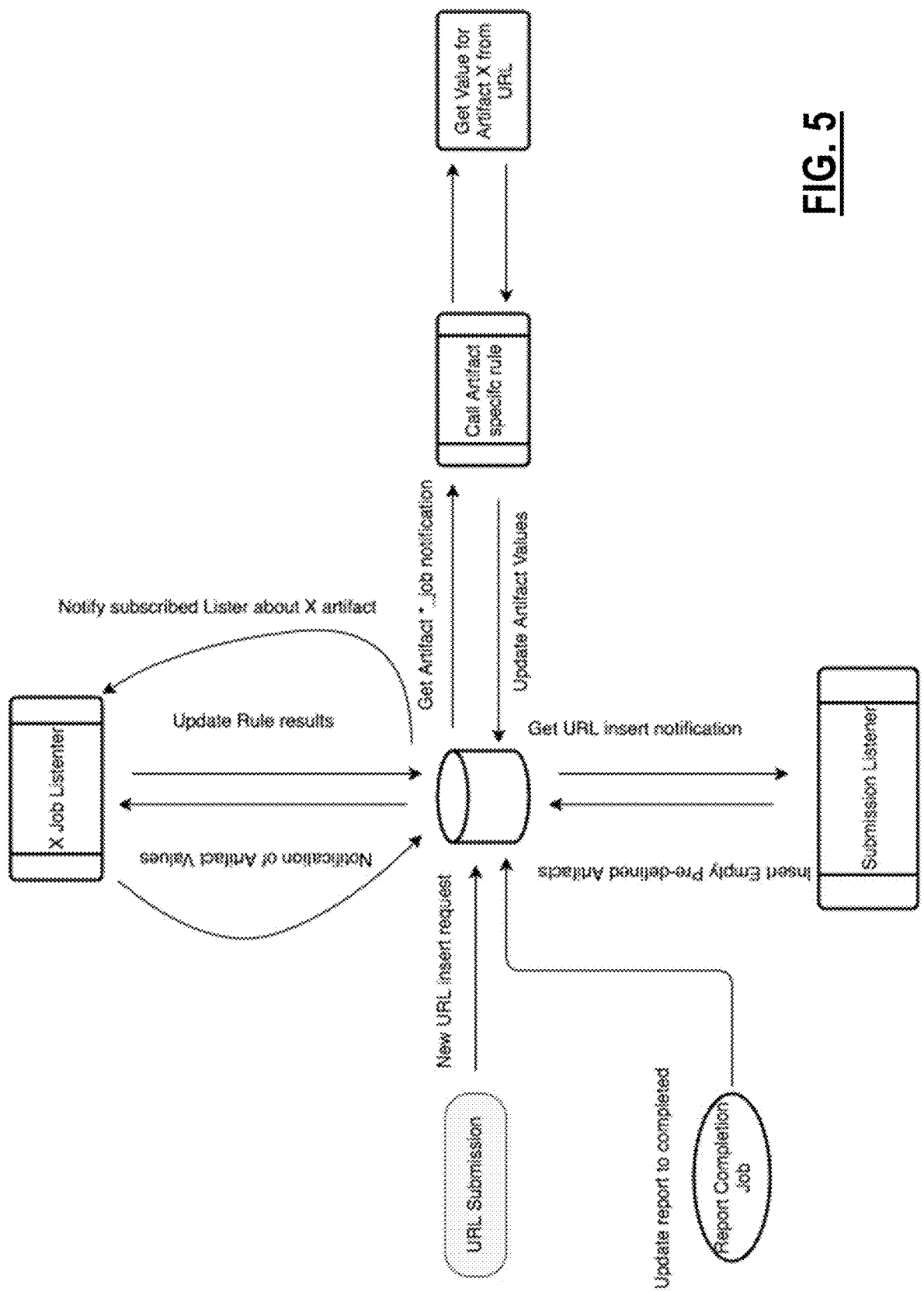
FIG. 5 is a block diagram of data flow for URL risk determination.
Figure 6:
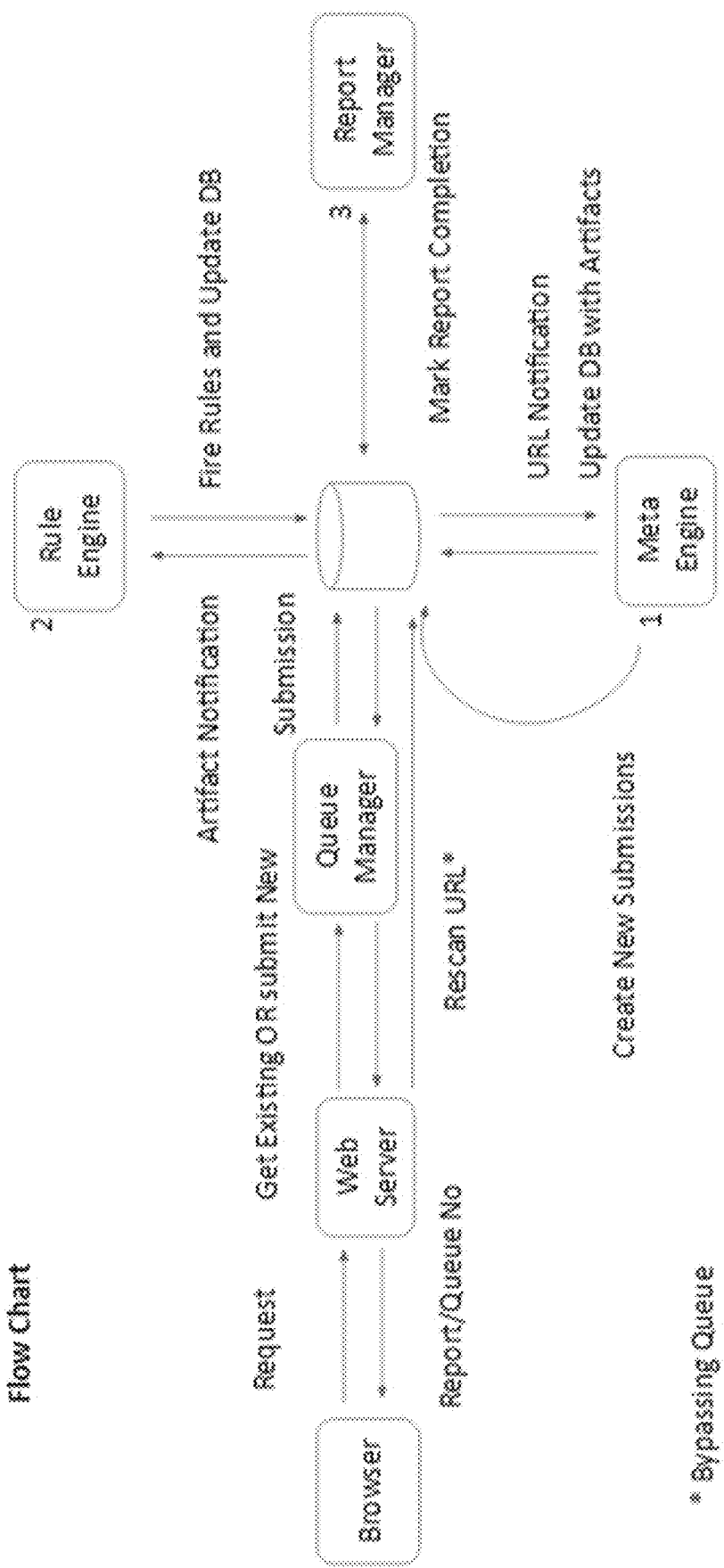
FIG. 6 is a flow diagram of URL risk determination.

FIG. 5 is a block diagram of data flow for URL risk determination. FIG. 6 is a flow diagram of URL risk determination. The URL risk determination system includes a database and various software modules including a configuration module for configuration files and DB schema, listener modules which are artifact listeners which wait for notification to occur from database, a log module, and the like. There can be artifact scripts that find out artifacts out of a URL, and listener scripts (basically these are the classes which do actual work). The URL risk determination system can be implemented via the network configurations 100A, 100B, 100C.

The URL risk determination system is based on artifacts extracted from the URL. Rules get triggered based on an artifact or set of artifacts and the aggregate count is treated as final score for the URL. URL can be classified in one of the three categories such as benign, suspicious or malicious. The description herein includes example scoring and those skilled in the art will recognize this is for illustration purposes and other scores are also contemplated. For example, for benign, the score is <40, for suspicious, the score is in-between 40 to 74 and beyond this everything is marked as malicious.

The URL risk determination system can mainly rely on LISTEN, NOTIFY feature from PostgreSQL. Whenever there is a Change of value in a row, Trigger issues NOTIFY so that whomsoever is looking for that type of notification via LISTEN can act on it. Specific Stored Procedures are defined while creating the DB Schema and so does the Triggers.

The listener modules are configured to subscribe for a specific type of artifact value or combination of artifact values. Multiple modules can listen, but the one that gets the notification first can perform the job. Once completed, the database is updated with the status.

Here are some example artifacts that can be extracted from the URL: ['asn','user_agent','content_size','content_type','server','redirected_url', 'status_code','redir_status_code','country','domain','headers','ipaddr','md5','mime', 'port','schema','sha256','store_loc','tld','url']

The following describes steps performed by the URL risk determination system.

Pre-Steps include the Submission Listener, Artifact Listener (for updating artifacts) & Job Listener (for rules) being started before anything happens, and a Report Completion Service Takes care of marking status to 'completed' for submitted URL.

The processing steps are as follows:
a) a URL is inserted into submissions table in scanner DB,
b) On submit, a trigger sends notification to Submission Listener about there is a new submission,
c) a Submission Listener fills out pre-defined artifacts with empty values to an artifact table,
d) On Insert to the artifact table, a trigger issues notifications for subscribers looking for to process artifacts and end up making updates to artifact table,
e) When the artifact table is updated with artifact values, a trigger notifies subscriber for a specific job type.
f) the Job Listener picks notification and eventually make updates to rules table in scanner database.

When everything is completed, the Report Completion service marks URL status as 'completed The listener scripts are looking for a notification from PostgreSQL. Where this notification is being transmitted, further processing occurs, else it goes back to the loop and wait for the notification. Depending upon the type of artifact, classes are being used from modules/rules to find out individual rule risk which contributes to the final score.

Once there is a suspicious or malicious URL, this can cause an update to YARA rules, a whitelist, regular expressions, etc. Also, further processing can be enabled for these URLs, such as through machine learning models.

Cloud-Based Security

An example cloud security service is Zscaler Internet Access (ZIA), available from the assignee and applicant of the present disclosure. ZIA provides a Secure Web and Internet Gateway that, among other things, processes outbound traffic from thousands of tenants and millions of end users (or more). For example, ZIA can process tens or hundreds of billions of transactions or more a day, including full inspection of encrypted traffic, millions to billions of files every day. One important feature of this cloud security service is content classification and blocking/allowing transactions based on the classification of content. For example, every Uniform Resource Locator (URL) can be classified in any of a plurality of categories, and each user's transaction can be allowed or blocked based on associated policy for that category. The URL risk determination can be used for inline monitoring, blocking, allowing, etc.

Machine Learning URL Processing

The present disclosure relates can utilizing Machine Learning (ML) for dynamic content classification, such as for use in a cloud-based security system for allowing/blocking Web requests based on the classified content, in combination with the URL risk determination. The present disclosure relates to building an ML classifier for URLs to determine the content of URLs, specifically focusing on data labeling, data preprocessing for feature building, feature extraction and building, serializing a model into a flat buffer decision tree structure, and using the flat buffer decision tree structure on production data to classify new URLs. This enables new URL content to be accurately and efficiently categorized, and once categorized, a cloud service and use the classifications to allow/block requests from users.

Machine learning can be used in various applications, including malware detection, intrusion detection, threat classification, the user or content risk, detecting malicious clients or bots, etc. In a particular use case, machine learning can be used on a content item, e.g., a file, to determine if further processing is required during inline processing in the cloud-based service. For example, machine learning can be used in conjunction with a sandbox to identify malicious files. A sandbox, as the name implies, is a safe environment where a file can be executed, opened, etc. for test purposes to determine whether the file is malicious or benign. It can take a sandbox around 10 minutes before it is fully determined whether the file is malicious or benign.

Machine learning can determine a verdict in advance before a file is sent to the sandbox. If a file is predicted as benign, it does not need to be sent to the sandbox. Otherwise, it is sent to the sandbox for further analysis/processing. Advantageously, utilizing machine learning to pre-filter a file significantly improves user experience by reducing the overall quarantine time as well as reducing workload in the sandbox. Of course, machine learning cannot replace the sandbox since malicious information from a static file is limited, while the sandbox can get a more accurate picture with dynamic behavior analysis. Further, it follows that the machine learning predictions require high precision due to the impact of a false prediction, i.e., finding a malicious file to be benign.

In the context of inline processing, sandboxing does a great job in detecting malicious files, but there is a cost in latency, which affects user experience. Machine learning can alleviate this issue by giving an earlier verdict on the static files. However, it requires ML to have extremely high precision, since the cost of a false positive and false negative are very high. For example, a benign hospital life-threatening file, if mistakenly blocked due to an ML model's wrong verdict, would cause a life disaster. Similarly, undetected ransomware could cause problems for an enterprise. Therefore, there is a need for a high-precision approach for both benign and malicious files.

The conventional approach to improve precision includes improving the probability threshold to increase precision. A p-value (probability value) is a statistical assessment for measuring the reliability of a prediction, but this does not identify the unreliability of predictions with high probabilities.

A description utilizing machine learning in the context of malware detection is described in commonly-assigned U.S. patent application Ser. No. 15/946,546, filed Apr. 5, 2018, and entitled "System and method for malware detection on a per packet basis," the content of which is incorporated by reference herein. As described here, the typical machine learning training process collects millions of malware samples, extracts a set of features from these samples, and feeds the features into a machine learning model to determine patterns in the data. The output of this training process is a machine learning model that can predict whether a file that has not been seen before is malicious or not.

URL Filtering/Content Classification

With URL filtering, IT can limit exposure to liability by managing access to Web content based on a site's categorization. The URL filtering policy includes per-tenant definable rules that include criteria, such as URL categories, users, groups, departments, locations, and time intervals. There is also a recommended (default) policy for URL filtering. To allow granular control of filtering, the URLs can be organized into a hierarchy of categories. In an embodiment, there can be high-level classes, which are then each divided into predefined super-categories, and then further divided into predefined categories. The classes may be functional, such as bandwidth loss, business use, general surfing, legal liability, productivity loss, and privacy risk. Super-categories may include high-level identifiers such as entertainment, business, education, IT, communications, government, news, adult, gambling, shopping, social, games, sports, etc. The categories may further include more granular identifiers, e.g., media streaming, marketing, stock trading, blogs, type of adult content, copyright infringement, profanity, etc. Those skilled in the art will recognize there can be any level of classification, and any such level or granularity is contemplated herein. That is, any number of categories and hierarchy of categories is contemplated.

The cloud-based service, offering a service for URL filtering, can be configured to take specific action based on a classification of a URL, such as:

Allow: The service allows access to the URLs in the selected categories. One can still restrict access by specifying a daily quota for bandwidth and time. For example, one can allow users to access Entertainment and Recreation sites but restrict the bandwidth allowed for these sites, so they do not interfere with business-critical applications. The daily time quota can be based on the time that the rule is created. For example, if the rule is created at 11 a.m. PST, then the quota is renewed at 11 a.m. PST the next day.

Caution: When a user tries to access a site, the service displays a Caution notification. One can use the system-defined notification, customize the text, or create user-defined notifications and direct users to it.

Block: The service displays a Block notification. One can use the system-defined notification, customize the text, or create your notification and direct users to it. Additionally, one can allow some users or groups to override the block with the Allow Override option. For example, one can block students from going to YouTube but allow the teachers. Teachers will be prompted to enter their override password. This can be company provided credentials such as single sign-on credentials or hosted database credentials based on the Enable Identity-based Block Override settings.

Dynamic Content Categorization

The present disclosure includes a machine learning technique to classify a Web page as containing content related to one of a plurality of categories. This is advantageous as new URL content is ever-evolving. In the context of the cloud-based system 100, if a new URL is uncategorized, the present disclosure can be used to provide a categorization quickly. Thus, the cloud-based service is not constrained to only categorizing URLs that are already classified. The approach generally includes training a machine learning model offline, such as with training data labeled according to the URL category. A new URL is loaded, the Web page is parsed, words and other characteristics of the Web page are extracted, and the words and other characteristics are analyzed with the machine learning model offline to output a predicted category. This machine learning process in production must be quick to avoid latency between a user request and an answer (block/allow) by the cloud-based service.

Figure 7:
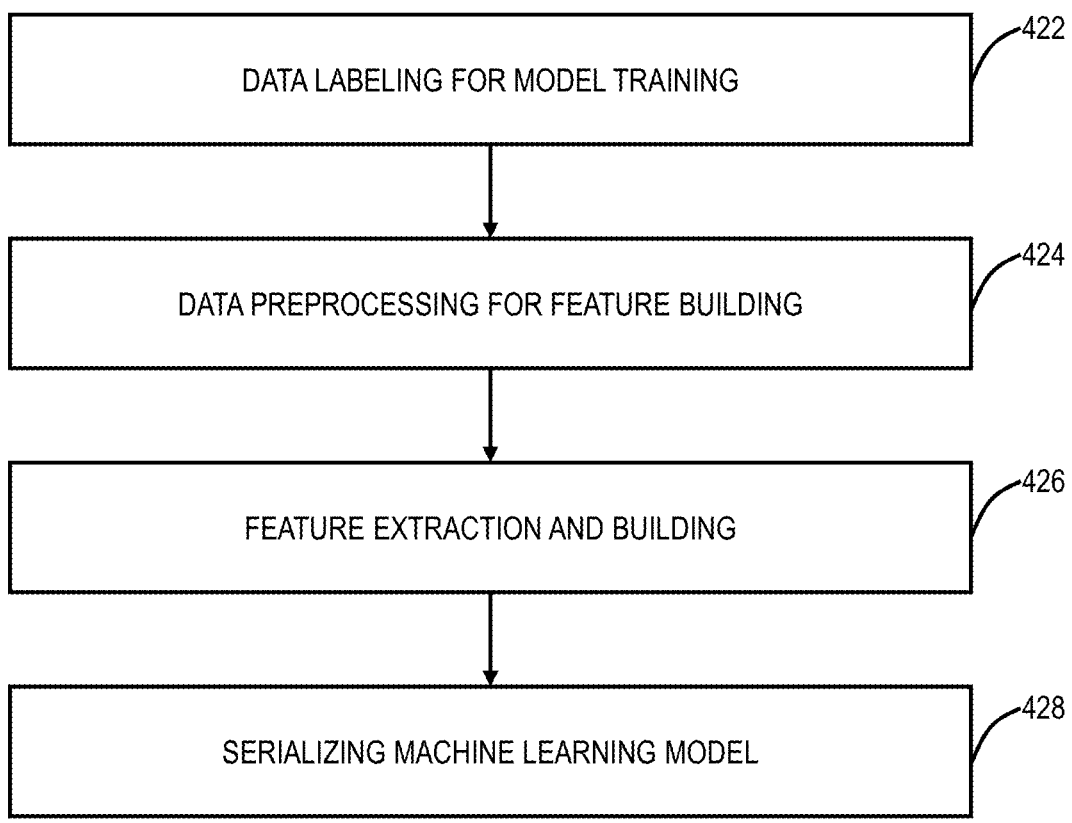
FIG. 7 is a flowchart of a model training process for URL content classification.

FIG. 7 is a flowchart of a model training process 420 for URL content classification. The model training process 420 includes data labeling for model training (step 422), data preprocessing for feature building (step 424), feature extraction and building (step 426), and serializing a machine learning model (step 428). The model training process 420 contemplates implementation as a method, via a server 200, and as a non-transitory computer-readable storage medium having computer-readable code stored thereon for programming one or more processors to perform steps.

Of note, the model training process 420 leverages the cloud-based service and the fact the cloud-based service is multi-tenant, has a large number of users, and can process tens or hundreds of billions of transactions or more a day. That is, the cloud-based service has a large data set of URL transactions. The cloud-based service can utilize a database of known URL classifications. The present disclosure is focused on classifying new URLs and their content such that the new URLs can be added to the database of known URL classifications. Again, the reach and extent of the cloud-based service enables the detection of unknown URLs as they pop up. The large data set can be stored in a storage cluster and used herein for model training.

Each of the steps in the model training process 420 is now described in detail.

Data Labeling for Model Training

The data labeling for model training step 422 includes obtaining data from the cloud-based service for training a machine learning model via supervised learning. That is, the cloud-based service has a large amount of data based on ongoing monitoring, and this data can be leveraged to train a model. The data labeling for model training step 422 includes running a big data query on the URL transactions in the storage cluster and filtering out websites relevant to specific categories. Here, it is possible to obtain a large amount of data that can be labeled with specific URL categories.

The data labeling for model training step 422 can also include validation of the data. This can include running scripts on the data to validate the existence of domains and running scripts that may use third party services to validate the websites.

The data labeling for model training step 422 can also include arranging the data such as arranging the websites in order of their content size, such as in descending order.

Finally, the data labeling for model training step 422 can include using scripts as well as human-based verification to validate the URLs in the data match the category they are assigned to. The objective here is to make sure the data for training is properly labeled.

An output of the data labeling for model training step 422 is a set of URLs, with each being assigned to a category of a plurality of categories.

Data Preprocessing for Feature Building

A feature is an individual measurable property or characteristic of a website. For an effective machine learning model, it is important to choose informative, discriminating, and independent features. For URL classification, each feature can be anything that is measurable and representable numerically. The data preprocessing for feature building step 424 relates to manipulating the data from raw Hypertext Markup Language (HTML) files for each URL from the data. The manipulating involves processing the raw HTML files for feature extraction and building.

The data preprocessing for feature building step 424 includes obtaining a raw HTML file for each URL in the set of URLs. This can be accomplished by loading each URL and storing the raw HTML file. Each of the raw HTML files is assigned the same category as the URL category from the data labeling for model training step 422.

For each of the raw HTML files, the data preprocessing for feature building step 424 performs data preprocessing. This means the raw data is manipulated to better allow the raw data to be used for features. That is, preprocessing means processing data in the raw HTML files and the pre means before the features are extracted/built. An output of the data preprocessing for feature building step 424 is data for each URL with an associated category, where the data is ready for feature extraction.

The preprocessing can include extracting specific/relevant HTML tags from the raw HTML files. The preprocessing can include converting all extracted data to text (e.g., images, etc. can be recognized), converting all words to lowercase (or uppercase, as long as it is uniform), and the like. The preprocessing can also include removing various data that is not relevant to features including, for example, special characters (e.g., < >, :, " ", etc.), numbers, cities/countries/places/etc., names, header and footer data, and the like. Also, the preprocessing can include combing all hyphens (i.e., -) to single words (e.g., abc-def→abcdef). Further, the preprocessing can include removing frequent words that do not contain much information, such as "a," "of," "the," etc. Finally, the preprocessing can include reducing words to their stem (e.g., "play" from "playing") using various stemming techniques.

Again, after the data preprocessing for feature building step 404, the raw HTML files are now a series of words with an associated category.

Feature Extraction/Building

The feature extraction and building step 426 utilizes the output from the data preprocessing for feature building step 424, namely the series of words with an associated category. The feature extraction and building step 406 is building features for each category and uses the series of words for each URL for each category.

The feature extraction and building step 426 includes calculating Term Frequency (TF) and Inverse document frequency (IDF) for each URL and its associated data. TF-IDF is a numerical statistic that is intended to reflect how important a word is to a document in a collection. The TF-IDF value increases proportionally to the number of times a word appears in a document and is offset by the number of documents in a collection that contain the word, which helps to adjust for the fact that some words appear more frequently in general.

Next, the words from the TF-IDF are ranked in order of importance. With the words ranked for each category, the feature extraction and building step 426 includes gathering important features for each category. This can include a reverse feature elimination technique to gather important features, using a selectKbest technique to gather important features, building a support vector machine model and using model weights to gather important features, etc.

The feature extraction and building step 426 can include a combination of the reverse feature elimination technique, selectKbest technique, and the support vector machine model to create a union corpus of words arranged in terms of importance.

Also, the feature extraction and building step 426 can use human-based selection to select words that describe the semantics and context of the category.

An output of the feature extraction and building step 426 is a set of features for each category of URL classification.

Serializing LightGBM Model

Finally, with all of the relevant features for each category of URL classification, the model training process 420 includes the serializing machine learning model step 428. In an embodiment, the present disclosure utilizes the Light Gradient Boosted Machine (LightGBM) model. LightGBM is an open-source distributed gradient boosting framework for machine learning originally developed by Microsoft. It is based on decision tree algorithms and used for ranking, classification and other machine learning tasks. Here, the model training process 420 includes marshaling the LightGBM model into a flat buffer decision tree structure based on the extracted features.

URL Content Classification Process

Figure 8:
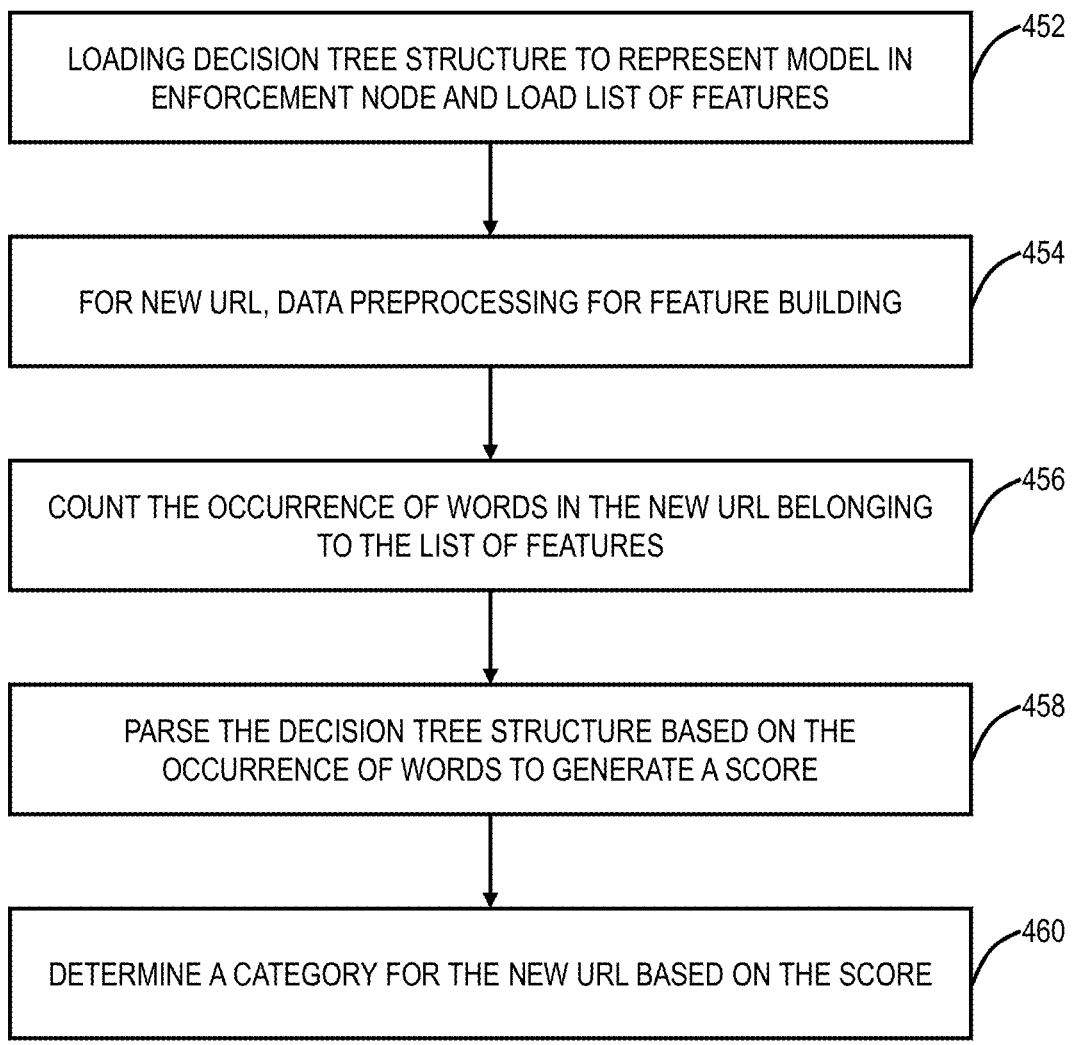
FIG. 8 is a flowchart of a URL content classification process.

FIG. 8 is a flowchart of a URL content classification process 450. The URL content classification process 450 contemplates implementation as a method, via a server 200, and as a non-transitory computer-readable storage medium having computer-readable code stored thereon for programming one or more processors to perform steps. In an embodiment, the URL content classification process 450 contemplates operation via a node in a cloud-based system. Specifically, the URL content classification process 450 utilizes a trained machine learning model, such as one from the model training process 400.

The cloud-based system 100, via the enforcement node 150, can be configured for inline monitoring of the users 102. One aspect of this inline monitoring can be to allow/block URL content based on policy, i.e., specific categories. The cloud-based system 100 can include a database of known URL categories for URLs. The URL content classification process 450 can be implemented to classify the content of an unknown URL.

The URL content classification process 450 includes loading a decision tree structure to represent the model in an enforcement node 150 and loading a list of features (step 452). Here, an in-memory decision tree structure is formed in the enforcement nodes 150 to represent the machine learning model.

For a new URL, i.e., uncategorized URL, the URL content classification process 450 includes data preprocessing for feature building (step 454). This step is similar to the data preprocessing for feature building step 404 to process a raw HTML file associated with the new URL.

The URL content classification process 450 includes counting the occurrence of words in the new URL belonging to the list of features in the decision tree structure (step 456).

The URL content classification process 450 includes parsing the decision tree structure based on the occurrence of words to generate a score (step 458).

The URL content classification process 450 includes determining a category for the new URL based on the score (step 460).

Finally, the URL content classification process 450 can store the determined category in the database for future categorization.

Dynamic YARA

YARA is the name of a tool primarily used in malware research and detection that provides a rule-based approach to create descriptions of malware families based on textual or binary patterns. A description is essentially a YARA rule name, where these rules include sets of strings and a Boolean expression. The language used has traits of Perl compatible regular expressions.

The present disclosure provides an approach to enhance the detection capabilities of a cloud sandbox. At times there are cases where it is not possible to modify Sandbox signatures due to risk of False Negatives. The present disclosure can address the specific False Positive (FP) cases. Features of the present disclosure include Malware detection efficacy, Malware attribution, Dynamic scoring, Writing a YARA rule on unpacked Portable Executable (PE) files, and Dynamic chaining of cloud sandbox signatures.

The Portable Executable format is a file format for executables, object code, DLLs, FON Font files, and others used in 32-bit and 64-bit versions of Windows operating systems. The PE format is a data structure that encapsulates the information necessary for the Windows OS loader to manage the wrapped executable code.

The approach described herein includes three components—1) Dynamic YARA engine, 2) Dynamic YARA Python signature, and 3) Dynamic YARA rules.

Figure 9:
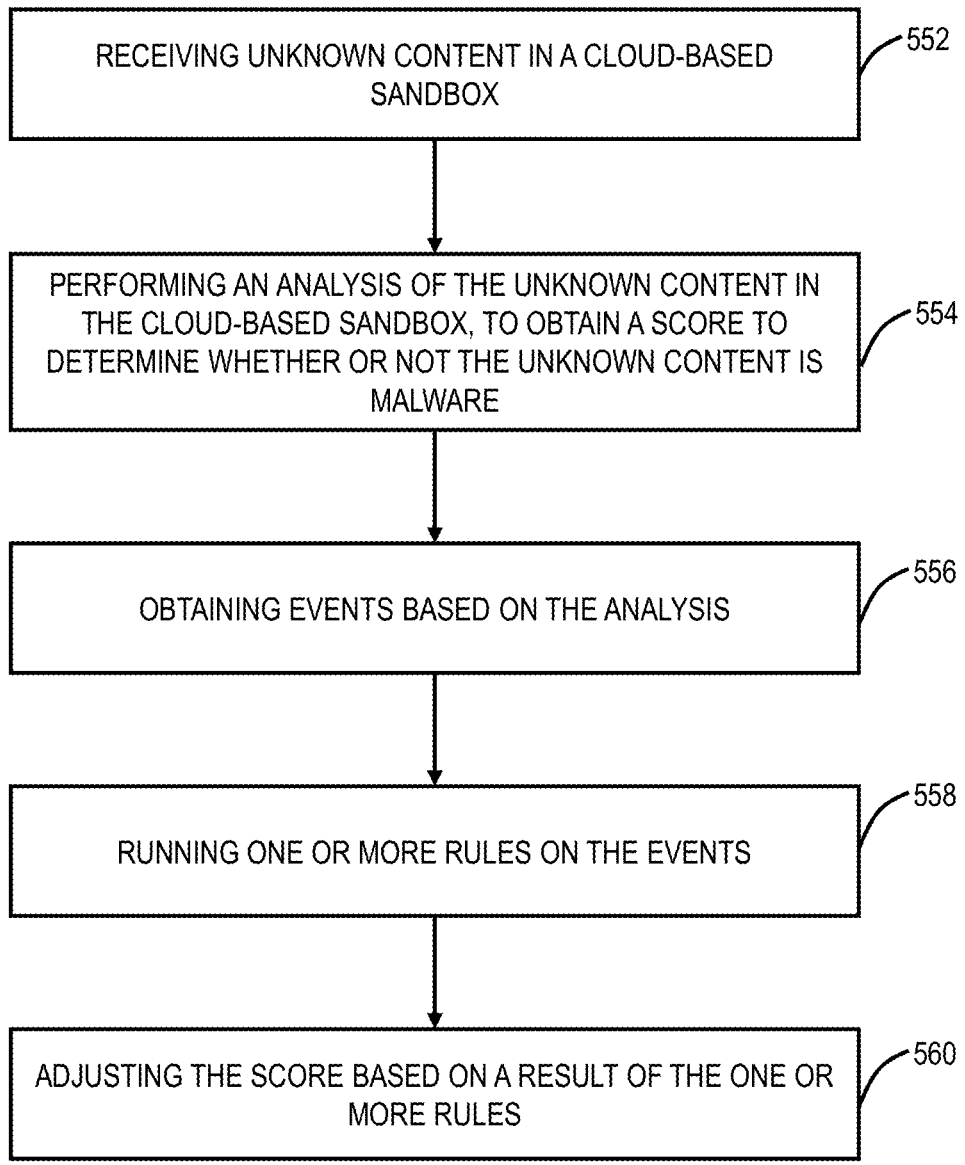
FIG. 9 is a flowchart of a process for dynamic rules in a cloud-based sandbox.

FIG. 9 is a flowchart of a process 500 for dynamic rules in a cloud-based sandbox. The process 500 can be a computer-implemented method, embodied as instructions in a non-transitory computer-readable medium, and implemented via the server 200. The process 500 includes receiving unknown content in a cloud-based sandbox (step 552); performing an analysis of the unknown content in the cloud-based sandbox, to obtain a score to determine whether or not the unknown content is malware (step 554); obtaining events based on the analysis (step 556); running one or more rules on the events (step 558); and adjusting the score based on a result of the one or more rules (step 560). The process 500 can further include classifying the unknown content as malware or clean based on the adjusted score.

The analysis can include a static analysis and a dynamic analysis. The events are generated during the static analysis and the dynamic analysis. The events can include any of file extension, signature hits, paths, title and text of windows created, DNS query names, processes created, memory information, mutex names, HTTP data, and registry information. The events can be processed and stored in a dynamic data buffer in a specific format, for processing by the one or more rules. The events can include content of unpacked files determined to be executable files. The adjusting can include a dynamic score for the one or more rules based on the score from the analysis.

URL Risk Determination Process

Figure 10:
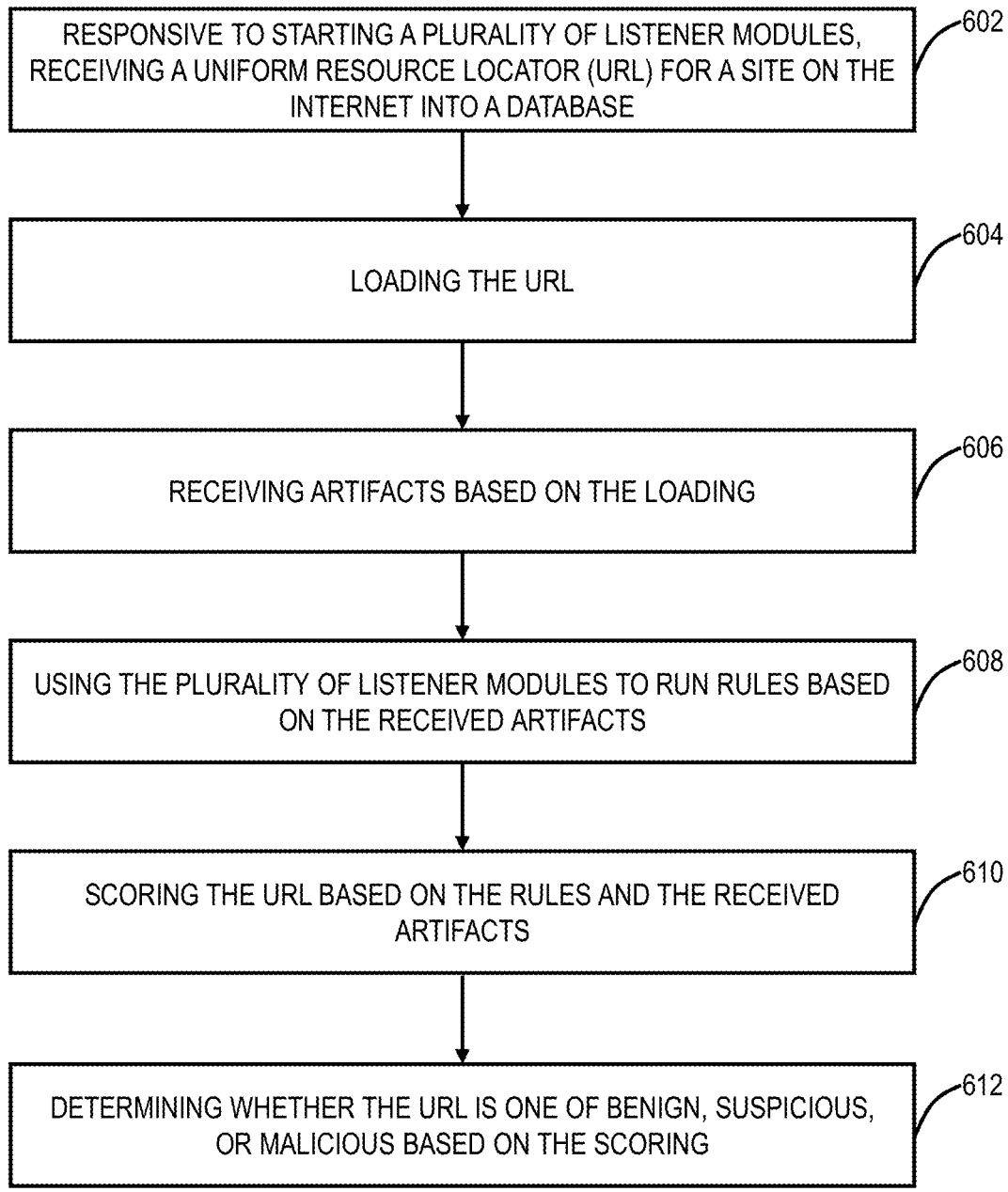
FIG. 10 is a flowchart of a URL risk determination process.

FIG. 10 is a flowchart of a URL risk determination process 600. The process 600 can be a computer-implemented method, embodied as instructions in a non-transitory computer-readable medium, and implemented via the server 200.

The process 600 includes, responsive to starting a plurality of listener modules, receiving a Uniform Resource Locator (URL) for a site on the Internet into a database (step 602); loading the URL (step 604); receiving artifacts based on the loading (step 606); using the plurality of listener modules to run rules based on the received artifacts (step 608); scoring the URL based on the rules and the received artifacts (step 610); and determining whether the URL is one of benign, suspicious, or malicious based on the scoring (step 612).

The process 600 can include any of blocking the URL, allowing the URL, further analyzing the URL, adding the URL to a whitelist or blacklist, and providing a notification, based on whether the URL is benign, suspicious, or malicious. The process 600 can include, responsive to the URL being suspicious, running a machine learning model on the URL.

The database can use LISTEN and NOTIFY in PostgreSQL. The artifacts can include any of 'asn', 'user_agent', 'content_size', 'content_type', 'server', 'redirected_url', 'status_code', 'redir_status_code', 'country', 'domain', 'headers', 'ipaddr', 'md5', 'mime', 'port', 'schema', 'sha256', 'store_loc', 'tld', and 'url'. The loading the URL can be from a queue. The artifacts can include external elements, content checks, host checks, and URL checks.

URL Risk Determination Examples
ANALYSIS
Redirections https://worldpatents.com/301
HTTP Status Code 200
Content Size 38008 bytes
Content Type text/html; charset=UTF-8
IP Address 104.154.117.56
Country US
Web Server nginx
External Elements

| URL | RISK |
|---|---|
| worldpatents.com/about-us/ .. | Benign |
| worldpatents.com/about-us/lawrence-a-baratta/ .. | Benign |
| worldpatents.com/services/ .. | Benign |

Content Checks

| TEST | DESCRIPTION | RISK |
|---|---|---|
| Park/Disabled Domain | No match | 0 |
| Known Bad Hash | 2fd88a17422e2823bae5153a236065a8 | 0 |
| Content Inspection | No match | 0 |
| Phishing Heuristic | Not a phishing page | 0 |

URL Checks

| TEST | DESCRIPTION | RISK |
|---|---|---|
| File-Type Risk | | 0 |
| Zscaler Malicious URL | No Match | 0 |
| Zscaler Inline | No match | 0 |
| Top-Level Domain Risk | No match | 0 |
| SSL-Cert Check | | 0 |
| Non-Standard Port | HTTP | 0 |
| Suspicious URL Pattern | No match | 0 |

| TEST | DESCRIPTION | RISK |
|---|---|---|
| Geo-location Risk | | 0 |
| VirusTotal Content Check | Positives: 0 | 0 |

Host Checks

| TEST | DESCRIPTION | RISK |
|---|---|---|
| Autonomous System Risk | ASN: 15169 GOOGLE - Google Inc.,US | −10 |
| NetBlock Size Risk | Netblock size: 131072 | 0 |
| SURBL Block | No match | 0 |
| Zscaler Malicious IP | | 0 |
| VirusTotal IP Submission | Badness ratio: 0.01 | 0 | malware.wicar.org . . .
User-Agent Mozilla/5.0 (Windows NT 6.3; Win64; x64; Trident/7.0; rv:11.0) like Gecko
Status Completed
Test Results
Malicious 100/100
Reanalyze Send Us Feedback
Analysis
ANALYSIS
Redirections http://malware.wicar.org/HTTP
Status Code 200
Content Size 334 bytes
Content Type text/html; charset=UTF-8
IP Address 208.94.116.21
Country US
Web Server Apache
External Elements

| URL | RISK |
|---|---|
| www.wicar.org/test-malware.html .. | Benign |
| www.wicar.org/test-malware.html .. | Benign |

Content Checks

| TEST | DESCRIPTION | RISK |
|---|---|---|
| Park/Disabled Domain | No match | 0 |
| Known Bad Hash | da583525f1b750fff723f978da457e0e | 0 |
| Content Inspection | No match | 0 |
| Phishing Heuristic | Not a phishing page | 0 |

URL Checks

| TEST | DESCRIPTION | RISK |
|---|---|---|
| VirusTotal Content Check | Positives: 0 | 0 |
| SSL-Cert Check | | 0 |
| Geo-location Risk | | 0 |
| Zscaler Malicious URL | MALWARE | 100 |
| Zscaler Inline | MALWARE | 100 |
| Top-Level Domain Risk | No match | 0 |
| Non-Standard Port | HTTP | 0 |
| File-Type Risk | | 0 |
| Suspicious URL Pattern | No match | 0 |

Host Checks

| TEST | DESCRIPTION | RISK |
|---|---|---|
| VirusTotal IP Submission | Badness ratio: 0.01 | 0 |
| SURBL Block | No match | 0 |
| Autonomous System Risk | ASN: 40630 | 0 |
| NetBlock Size Risk | Netblock size: 1024 | 5 |
| Zscaler Malicious IP | | 0 |

CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A non-transitory computer-readable storage medium having computer-readable code stored thereon for programming one or more processors to perform steps of:
responsive to starting a plurality of artifact listener modules, receiving a Uniform Resource Locator (URL) for a site on the Internet into a cloud based scanner database of known URL classifications, the database is in communication with the artifact listener modules;
loading the URL;
receiving artifacts based on the loading;
triggering, by one or more database events, the artifact listener modules based on specific artifact types;
executing, by the artifact listener modules, rules associated with respective artifact types to evaluate a plurality of risk score contributions;
aggregating the risk score contributions from the artifact listener modules to compute a final score for the URL; and
determining whether the URL is one of benign, suspicious, or malicious based on the final score.

2. The non-transitory computer-readable storage medium of claim 1, wherein the steps include any of blocking the URL, allowing the URL, further analyzing the URL, adding the URL to a whitelist or blacklist, and providing a notification, based on whether the URL is benign, suspicious, or malicious.

3. The non-transitory computer-readable storage medium of claim 1, wherein the steps include responsive to the URL being suspicious, running a machine learning model trained on a Logistic Regression model on the URL.

4. The non-transitory computer-readable storage medium of claim 1, wherein the cloud based scanner database uses PostgreSQL LISTEN and NOTIFY functionality to notify listener modules of updates to submissions or artifacts, the artifact listener modules being configured to evaluate artifact-based rules that contribute to classification of the URL.

5. The non-transitory computer-readable storage medium of claim 1, wherein the artifacts include any of 'asn', 'user_agent', 'content_size', 'content_type', 'server', 'redirected_url', 'status_code', 'redir_status_code', 'country', 'domain', 'headers', 'ipaddr', 'md5', 'mime', 'port', 'schema', 'sha256', 'store_loc', 'tld', and 'url'.

6. The non-transitory computer-readable storage medium of claim 1, wherein the loading the URL is from a queue.

7. The non-transitory computer-readable storage medium of claim 1, wherein the artifacts include external elements, content checks, host checks, and URL checks, the artifacts being extracted by artifact scripts and updated in an artifact table for processing by the artifact listener modules.

8. A method comprising steps of:
responsive to starting a plurality of artifact listener modules, receiving a Uniform Resource Locator (URL) for a site on the Internet into a cloud based scanner database of known URL classifications, the database is communicatively coupled to the artifact listener module;
loading the URL;
receiving artifacts based on the loading;
triggering, by one or more database events, the artifact listener modules based on specific artifact types;
executing, by the artifact listener modules, rules associated with respective artifact types to evaluate a plurality of risk, score contributions;

aggregating the risk score contributions from the artifact listener modules to compute a final score for the URL; and determining whether the URL is one of benign, suspicious, or malicious based on the final score.

9. The method of claim 8, wherein the steps include any of blocking the URL, allowing the URL, further analyzing the URL, adding the URL to a whitelist or blacklist, and providing a notification, based on whether the URL is benign, suspicious, or malicious.

10. The method of claim 8, wherein the steps include
responsive to the URL being suspicious, running a machine learning model on the URL.

11. The method of claim 8, wherein the cloud based scanner database uses LISTEN and NOTIFY in PostgreSQL.

12. The method of claim 8, wherein the artifacts include any of 'asn', 'user_agent', 'content_size', 'content_type', 'server', 'redirected_url', 'status_code', 'redir_status_code', 'country', 'domain', 'headers', 'ipaddr', 'md5', 'mime', 'port', 'schema', 'sha256', 'store_loc', 'tld', and 'url'.

13. The method of claim 8, wherein the loading the URL is from a queue.

14. The method of claim 8, wherein the artifacts include external elements, content checks, host checks, and URL checks, the artifacts being extracted by artifact scripts in an artifact table by thee artifact listener modules.

15. A server comprising:
a network interface communicatively coupled to a network;
a processor communicatively coupled to the network interface; and
memory storing computer-executable instructions that, when executed, cause the processor to
responsive to starting a plurality of artifact listener modules, receiving a Uniform Resource Locator (URL) for a site on the Internet into a cloud based scanner database of known URL classifications, the database is in communication with the artifact listener module;
loading the URL;
receiving artifacts based on the loading;
triggering, by one or more database events, the artifact listener modules based on specific artifact types;
executing, by the artifact listener modules, rules associated with respective artifact types to evaluate a plurality of risk score contributions;
aggregating the risk score contributions from the artifact listener modules to compute a final score for the URL; and
determining whether the URL is one of benign, suspicious, or malicious based on the final score.

16. The server of claim 15, wherein the instructions that, when executed, cause the processor to any of blocking the URL, allowing the URL, further analyzing the URL, adding the URL to a whitelist or blacklist, and providing a notification, based on whether the URL is benign, suspicious, or malicious.

17. The server of claim 15, wherein the instructions that, when executed, cause the processor to
responsive to the URL being suspicious, running a machine learning model on the URL.

18. The server of claim 15, wherein the cloud based scanner database uses LISTEN and NOTIFY in PostgreSQL.

19. The server of claim 15, wherein the artifacts include any of 'asn', 'user_agent', 'content_size', 'content_type', 'server', 'redirected_url', 'status_code', 'redir_status_code', 'country', 'domain', 'headers', 'ipaddr', 'md5', 'mime', 'port', 'schema', 'sha256', 'store_loc', 'tld', and 'url'.

20. The server of claim 15, wherein the artifacts include external elements, content checks, host checks, and URL checks, the artifacts being extracted by artifact scripts and updated in an artifact table for processing by the artifact listener modules.

\* \* \* \* \*